US007870592B2

(12) United States Patent
Hudson et al.

(10) Patent No.: US 7,870,592 B2
(45) Date of Patent: Jan. 11, 2011

(54) METHOD FOR INTERACTIVE VIDEO CONTENT PROGRAMMING

(75) Inventors: Ron J. Hudson, Los Angeles, CA (US); Terrence T. Coles, Costa Mesa, CA (US); Craig D. Berry, Los Angeles, CA (US); Allen D. Easty, Carollton, TX (US)

(73) Assignee: Intertainer, Inc., Los Angeles, CA (US)

( * ) Notice: Subject to any disclaimer, the term of this patent is extended or adjusted under 35 U.S.C. 154(b) by 1016 days.

(21) Appl. No.: 09/921,097

(22) Filed: Jul. 31, 2001

(65) Prior Publication Data

US 2002/0078456 A1  Jun. 20, 2002

Related U.S. Application Data

(60) Provisional application No. 60/255,541, filed on Dec. 14, 2000.

(51) Int. Cl.
*H04N 7/173* (2006.01)
(52) U.S. Cl. .................. 725/112; 725/59; 725/102; 725/103; 725/109; 725/113
(58) Field of Classification Search ......... 725/112–113, 725/102, 37–39, 40–45, 103, 49, 109
See application file for complete search history.

(56) References Cited

U.S. PATENT DOCUMENTS

| | | | |
|---|---|---|---|
| 5,027,400 A | 6/1991 | Baji et al. |
| 5,191,573 A | 3/1993 | Hair |
| 5,235,680 A | 8/1993 | Bijnagte |
| 5,253,275 A | 10/1993 | Yurt et al. |
| 5,289,371 A | 2/1994 | Abel et al. |
| 5,307,495 A | 4/1994 | Seino et al. |
| 5,347,632 A | 9/1994 | Filepp et al. |

(Continued)

FOREIGN PATENT DOCUMENTS

EP  1016990  6/2000

(Continued)

OTHER PUBLICATIONS

Apple Inc., Google Inc., and *Napster Inc.'s Invalidity Contentions*, from Intertainer, Inc. v. Apple Computer, Inc., Google Inc., and Napster Inc., In the United States District Court for the Eastern District of Texas Marshall Division, Civil Action No. 2-06CV-549 TJW (Oct. 9, 2007).

(Continued)

*Primary Examiner*—Hunter B. Lonsberry
*Assistant Examiner*—Sumaiya A Chowdhury
(74) *Attorney, Agent, or Firm*—Martin & Ferraro, LLP

(57) ABSTRACT

The present invention is directed to a system and method for interacting with video by displaying one or more interface links associated with video content being displayed, pausing the video content when an interface link is interacted with, allowing the user to view ancillary content the interface link is linked to over a network, and un-pausing the video content after the user elects to continue viewing the video content. In one or more embodiments, the ancillary content may permit e-commerce, display additional video or other images, and/or include links to additional ancillary content. The present invention also includes a method for creating an interactive video.

92 Claims, 4 Drawing Sheets

U.S. PATENT DOCUMENTS

| | | | |
|---|---|---|---|
| 5,371,532 A | 12/1994 | Gelman et al. | |
| 5,408,630 A | 4/1995 | Moss | |
| 5,446,919 A | 8/1995 | Wilkins | |
| 5,539,450 A | 7/1996 | Handelman | |
| 5,539,735 A | 7/1996 | Moskowitz | |
| 5,553,281 A | 9/1996 | Brown et al. | |
| 5,557,541 A | 9/1996 | Schulhof et al. | |
| 5,576,951 A | 11/1996 | Lockwood | |
| 5,584,025 A | 12/1996 | Keithley et al. | |
| 5,616,876 A | 4/1997 | Cluts | |
| 5,636,346 A | 6/1997 | Saxe | |
| 5,652,615 A | 7/1997 | Bryant et al. | |
| 5,696,965 A | 12/1997 | Dedrick | |
| 5,706,448 A | 1/1998 | Blades | |
| 5,710,884 A | 1/1998 | Dedrick | |
| 5,710,887 A | 1/1998 | Chelliah et al. | |
| 5,717,923 A | 2/1998 | Dedrick | |
| 5,724,521 A | 3/1998 | Dedrick | |
| 5,729,594 A | 3/1998 | Klingman | |
| 5,734,961 A | 3/1998 | Castille | |
| 5,752,238 A | 5/1998 | Dedrick | |
| 5,754,787 A | 5/1998 | Dedrick | |
| 5,754,938 A | 5/1998 | Herz et al. | |
| 5,758,257 A | 5/1998 | Herz et al. | |
| 5,765,152 A | 6/1998 | Erickson | |
| 5,767,845 A | 6/1998 | Oashi et al. | |
| 5,790,423 A | 8/1998 | Lau et al. | |
| 5,790,426 A | 8/1998 | Robinson | |
| 5,790,935 A | 8/1998 | Payton | |
| 5,802,518 A | 9/1998 | Karaev et al. | |
| 5,805,154 A | 9/1998 | Brown | |
| 5,815,665 A | 9/1998 | Teper et al. | |
| 5,818,935 A | 10/1998 | Maa | |
| 5,819,271 A | 10/1998 | Mahoney et al. | |
| 5,825,876 A | 10/1998 | Peterson, Jr. | |
| 5,826,243 A | 10/1998 | Musmanno et al. | |
| 5,848,396 A | 12/1998 | Gerace | |
| 5,864,823 A | 1/1999 | Levitan | |
| 5,864,871 A | 1/1999 | Kitain et al. | |
| 5,892,508 A | 4/1999 | Howe et al. | |
| 5,892,900 A | 4/1999 | Ginter et al. | |
| 5,894,589 A | 4/1999 | Reber et al. | |
| 5,910,987 A | 6/1999 | Ginter et al. | |
| 5,918,014 A | 6/1999 | Robinson | |
| 5,926,624 A | 7/1999 | Katz et al. | |
| 5,929,849 A * | 7/1999 | Kikinis | 725/113 |
| 5,933,811 A | 8/1999 | Angles et al. | |
| 5,953,710 A | 9/1999 | Fleming | |
| 5,956,693 A | 9/1999 | Geerlings | |
| 5,956,700 A | 9/1999 | Landry | |
| 5,966,440 A | 10/1999 | Hair | |
| 5,973,683 A | 10/1999 | Cragun et al. | |
| 5,974,396 A | 10/1999 | Anderson et al. | |
| 5,987,509 A | 11/1999 | Portuesi | |
| 6,009,407 A | 12/1999 | Garg | |
| 6,011,537 A | 1/2000 | Slotznick | |
| 6,018,768 A | 1/2000 | Ullman et al. | |
| 6,026,369 A | 2/2000 | Capek | |
| 6,047,296 A | 4/2000 | Wilmott et al. | |
| 6,058,424 A | 5/2000 | Dixon et al. | |
| 6,065,042 A | 5/2000 | Reimer et al. | |
| 6,094,677 A | 7/2000 | Capek et al. | |
| 6,134,593 A | 10/2000 | Alexander et al. | |
| 6,154,738 A * | 11/2000 | Call | 707/4 |
| 6,157,929 A | 12/2000 | Zamiska et al. | |
| 6,163,272 A | 12/2000 | Goode et al. | |
| 6,163,795 A | 12/2000 | Kikinis | |
| 6,166,730 A | 12/2000 | Goode et al. | |
| 6,178,407 B1 | 1/2001 | Lotvin et al. | |
| 6,184,878 B1 * | 2/2001 | Alonso et al. | 725/109 |
| 6,185,541 B1 | 2/2001 | Scroggie et al. | |
| 6,189,008 B1 | 2/2001 | Easty et al. | |
| 6,199,082 B1 | 3/2001 | Ferrel et al. | |
| 6,202,056 B1 | 3/2001 | Nuttall | |
| 6,205,432 B1 | 3/2001 | Gabbard et al. | |
| 6,226,618 B1 | 5/2001 | Downs et al. | |
| 6,229,895 B1 | 5/2001 | Son et al. | |
| 6,237,022 B1 | 5/2001 | Bruck et al. | |
| 6,243,725 B1 | 6/2001 | Hempleman et al. | |
| 6,247,130 B1 | 6/2001 | Fritsch | |
| 6,269,275 B1 | 7/2001 | Slade | |
| 6,269,394 B1 | 7/2001 | Kenner et al. | |
| 6,292,785 B1 | 9/2001 | McEvoy et al. | |
| 6,292,797 B1 | 9/2001 | Tuzhilin et al. | |
| 6,314,451 B1 | 11/2001 | Landsman et al. | |
| 6,317,780 B1 | 11/2001 | Cohn et al. | |
| 6,334,116 B1 | 12/2001 | Ganesan et al. | |
| 6,337,901 B1 | 1/2002 | Rome et al. | |
| 6,338,044 B1 | 1/2002 | Cook et al. | |
| 6,338,094 B1 | 1/2002 | Scott et al. | |
| 6,345,256 B1 | 2/2002 | Milsted et al. | |
| 6,381,747 B1 | 4/2002 | Wonfor et al. | |
| 6,385,596 B1 | 5/2002 | Wiser et al. | |
| 6,389,403 B1 | 5/2002 | Dorak | |
| 6,418,421 B1 | 7/2002 | Hurtado et al. | |
| 6,424,998 B2 | 7/2002 | Hunter | |
| 6,457,010 B1 | 9/2002 | Eldering et al. | |
| 6,483,986 B1 * | 11/2002 | Krapf | 386/68 |
| 6,496,802 B1 | 12/2002 | Van Zoest | |
| 6,526,438 B1 | 2/2003 | Bienvenu et al. | |
| 6,535,856 B1 | 3/2003 | Tal | |
| 6,574,424 B1 | 6/2003 | Dimitri et al. | |
| 6,604,224 B1 | 8/2003 | Armstrong et al. | |
| 6,615,251 B1 | 9/2003 | Klug et al. | |
| 6,628,302 B2 * | 9/2003 | White et al. | 715/717 |
| 6,637,032 B1 | 10/2003 | Feinleib | |
| 6,640,145 B2 | 10/2003 | Hoffberg et al. | |
| 6,718,551 B1 | 4/2004 | Swix et al. | |
| 6,763,345 B1 | 7/2004 | Hempleman et al. | |
| 6,799,165 B1 | 9/2004 | Boesjes | |
| 6,801,576 B1 | 10/2004 | Haldeman et al. | |
| 6,810,527 B1 | 10/2004 | Conrad et al. | |
| 6,944,585 B1 | 9/2005 | Pawson | |
| 6,959,288 B1 | 10/2005 | Medina et al. | |
| 6,986,156 B1 * | 1/2006 | Rodriguez et al. | 725/95 |
| 7,017,173 B1 * | 3/2006 | Armstrong et al. | 725/87 |
| 7,103,905 B2 | 9/2006 | Novak | |
| 7,203,758 B2 | 4/2007 | Cook et al. | |
| 7,275,254 B1 * | 9/2007 | Jutzi | 725/72 |
| 2001/0025255 A1 | 9/2001 | Gaudian | |
| 2001/0042043 A1 | 11/2001 | Shear et al. | |
| 2002/0007493 A1 * | 1/2002 | Butler et al. | 725/109 |
| 2002/0016736 A1 | 2/2002 | Cannon et al. | |
| 2002/0056118 A1 | 5/2002 | Hunter et al. | |
| 2002/0059574 A1 | 5/2002 | Tudor et al. | |
| 2002/0062393 A1 | 5/2002 | Borger et al. | |
| 2002/0065715 A1 | 5/2002 | Tennyson et al. | |
| 2002/0072997 A1 | 6/2002 | Colson et al. | |
| 2002/0083006 A1 | 6/2002 | Headings et al. | |
| 2002/0087976 A1 | 7/2002 | Kaplan et al. | |
| 2002/0095606 A1 | 7/2002 | Carlton | |
| 2002/0112235 A1 | 8/2002 | Ballou et al. | |
| 2002/0120564 A1 | 8/2002 | Strietzel | |
| 2002/0138436 A1 | 9/2002 | Darling | |
| 2002/0172362 A1 | 11/2002 | Wonfor et al. | |
| 2002/0184255 A1 | 12/2002 | Edd et al. | |
| 2003/0014328 A1 | 1/2003 | Lindner | |
| 2003/0070167 A1 | 4/2003 | Holtz et al. | |
| 2003/0120549 A1 | 6/2003 | Lindner | |
| 2003/0120557 A1 | 6/2003 | Evans et al. | |
| 2003/0126033 A1 | 7/2003 | Evans et al. | |
| 2003/0191816 A1 | 10/2003 | Landress et al. | |

2004/0002903 A1  1/2004  Stolfo et al.

FOREIGN PATENT DOCUMENTS

| WO | WO 00/02143 | 1/2000 |
|---|---|---|
| WO | WO 01/27773 | 4/2001 |
| WO | WO 01/61592 | 8/2001 |

OTHER PUBLICATIONS

"Dig-Music: An On Demand Digital Musical Selection System Utilizing CATV Facilities," *IEEE Transactions on Consumer Electronics*, vol. CE-28, Issue 3, pp. xviii-xxvi (Aug. 1982).
"Final Report: Digital Audio Visual Work Trading by ATM—ATMAN," obtained from ftp://ftp.cordis.europa.eu/pub/infowin/docs/fr-225.pdf (Feb. 1999).
"Liquid Audio: Products & Services," http://web.archive.org/web/20000302001521/www.liquidaudio.com/services/anl/anl.html (and linked pages), stored on archive.org on Mar. 2, 2000.
A.J.S. Ball, G.V. Bochmann and Jan Gecsei, "Videotex Networks," IEEE Computer, vol. 13, Issue 12, Dec. 1980, pp. 8-14.
C. Federighi and L.A. Rowe, "A Distributed Hierarchical Storage Manager for a Video-on-Demand System," Proc. of IS&T/SPIE 1994 Int'l Symp. on Elec. Imaging: Science and Technology, San Jose, CA, Feb. 1994. Also appears in Storage and Retrieval for Image and Video Databases-II, The International Society for Optical Engineering, vol. 2185, pp. 185-197, 1994.
C. Fenger and M. Elwood-Smith, "The Fantastic Broadband Multimedia System: Software Platform Description" (v. 1.3), The Fantastic Corporation, May 19, 2000.
Diva Systems Corp. website (http://web.archive.org/web/19980509053455/divatv.com/onsetlayer2-3.htm), archived by web.archive.org in May 1998 (3 pages).
Diva Systems Corp., Form 10-K (Sep. 28, 1999). Available at http://www.sec.gov.
Earthnoise.com, archived by archive.org on various dates between Apr. 23, 2000 and May 11, 2003 (19 pages).
Frank J. Derfler, Jr. & Les Freed, *How Networks Work*, 4th Ed. Que Corporation (Macmillian Computer Publishing) (1998).
G. Caire, "ATMAN: Trading of Digital Audio Visual Contents," Multimedia Applications, Services and Techniques—ECMAST '98, David Hutchison, Ralf Schäfer (Eds.), 352-365, May 1998.
H. Jiang & A.K. Elmagarmid, "WVTDB—A Semantic Content-Based Video Database System on the World Wide Web," IEEE Transactions on Knowledge and Data Engineering, vol. 10, No. 6, Nov./Dec. 1998.
Hauglid et al., "WebSTAR—Video Database on WWW," IS&T/SPIE Conference on Multimedia Computing and Networking 2000, San Jose, California, Jan. 2000.
IMAKE.COM, as archived by archive.org, available at http://web.archive.org/web/19980110131456/www.imake.com/media/products/dbs.html, 1998.
Intertainer press release web page for 1998 (http//:www.intertainer.com/pr1998.html): press release dated Feb. 11, 1998, "Intertainer Unveils World's First Interactive Broadband Service for On-Demand Delivery of Full Motion Video-Based Entertainment" (http://www.intertainer.com/news/30.html).
Intertainer, www.intertainer.com, archived by web.archive.org on various dates between Feb. 21, 1999 and Jun. 21, 1999 (pp. 1-858).
J. Gecsei, *The Architecture of Videotex Systems*, Prentice-Hall, Inc. (1983).
Jeff Patterson & Ryan Melcher, *Audio on the Web*, Peachpit Press, 1998.
José Maria González, "The Berkeley Video on Demand System Implementation," May 22, 2000 (pp. 1-22).
L.A. Rowe, J. Boreczky, and C. Eads, "Indexes for User Access to Large Video Databases," *Proc. of IS&T/SPIE 1994 Int'l Symp. on Elec. Imaging: Science and Technology*, San Jose, CA, Feb. 1994, Also appears in Storage and Retrieval for Image and Video Databases II, The International Society for Optical Engineering, vol. 2185, pp. 150-161, 1994.
Liquid Audio, Inc., Liquifier Pro User Manual Version 1.2, Jun. 1997.
Loudeye Corp., Form 10-K (Feb. 27, 2001), available at http://www.sec.gov.
M. Carrer et al., "An Annotation Engine for Supporting Video Database Population," *Multimedia Tools and Applications*, vol. 5, No. 3, Nov. 1997, pp. 233-258. (available at hulk.bu.edu/pubs/papers/1997/TR-08-15-96.pdf).
M. Re, "Business-to-Business Digital Video Mega-Stores," *Advances in Information Technologies: The Business Challenge*, J.-Y. Roger et al. (Eds.), (IOS Press 1998).
Michael Robertson & Ron Simpson, *The Official MP3.com Guide to MP3*, Sybil Sosin ed., MP3.com, Inc., 1999.
MP3.com—Artist Area FAQ, http://web.archive.org/web/20010605151513/studio.mp3.com/cgi-bin/artistadmin/support.cgi?step=FAQ, (Archived by web.archive.org on Jun. 5, 2001) (pp. 1-40).
MP3.com website (http://www.mp3.com) archived by web.archive.org in May 1999 at http://web.archive.org/web/19990508090942/www.mp3.com/Artist/artistfaq.php3 (69 pages).
P.W. Bagenal and S.M. Upton, "Customer Management and the Eurocypher Conditional Access System at British Satellite Broadcasting," British Satellite Broadcasting, UK, pp. 270-277, Sep. 21-25, 1990.
Preston Gralla, *How the Internet Works, Millenium eEdition*, Que Corporation (Macmillian Computer Publishing) (Aug. 1999).
Rod Underhill & Nat Gertler, *The Complete Idiot's Guide to MP3: Music on the Internet*, 2000.
Ron White, *How Computers Work, Millennium Ed.*, Que Corporation (Macmillian Computer Publishing) (Sep. 1999).
Shareyourworld.com, archived by archive.org in Feb./Mar. 2000 (pp. 1-2).
T. Horstmann & R. Bentley, "Distributed Authoring on the Web with the BSCW Shared Workspace System," *StandardView*, vol. 5, No. 1, Mar. 1997 (pp. 9-16).
Request for Inter Partes Reexamination for U.S. Patent No. 6,925,469 to Headings et al. under 35 U.S.C. section 311 and 37 C.F.R. section 1.913; dated Oct. 31, 2007.
Jose Alvear, ShareYourWorld and Make Money From Your Home Videos, *StreamingMedia.com Research Center* (Mar. 7, 2000), at http://www.streamlingmedia.com/article.asp?id=5025&page=1 (pp. 1-2).
Anamaria Wilson, In Brief, *Time Magazine* (Mar. 20, 2000), available at http://www.time.com/time/magazine/article/0,9171,996415,00.html (p. 1).
Shareyourworld.com Web Site Archive (2000), available at http://web.archive.org/web/20000229135009/http://www.shareyourworld.com/about.phtml (pp. 1-15).
Wegener Announces MPEG-2 Based System for Broadcasters Using Micropolis Video Servers, Mar. 27, 1995.
"Buying Music over the Internet", R. Colombo, Liquid Audio White Paper, 1997.
Intertainer, Inc., May 24, 1999 Press Release, "Big Entertainment's Bige.com Expands Distribution Reach on Intertainer's On-Demand Entertainment Broadband Network," available at http://www.intertainer.com/news/19.html, 2 pages.
Intertainer website, "Advertising Information," available at http://web.archive.org/webI20000229142855/www.intertainer.com/service/advertising.html, Feb. 2000, 1 page.
Little et al., "Prospects for Interactive Video-on-Demand," IEEE Multimedia, Fall 1994, 22 pages.
Milenkovic, "Delivering Interactive Services via a Digital TV Infrastructure," IEEE, Fall 1998, 10 pages.

* cited by examiner

METHOD FOR INTERACTIVE VIDEO CONTENT PROGRAMMING

RELATED APPLICATION

This application claims the benefit of U.S. Provisional Application No. 60/255,541, filed Dec. 14, 2000, incorporated by reference herein.

BACKGROUND OF THE INVENTION

Some interactive programs include digital video discs (DVDS) or resident client computer applications, which enable users to view ancillary content that relates to the primary content being viewed. For example, DVD movies (the primary content) can include other footage relating to the movie, such as interviews with the cast, the movie trailer, and outtakes. DVDs also exist that permit the user to connect to a universal resource locator (URL) through a browser when viewed on a personal computer. This experience, however, is limited in that the user must use the DVD to make such a connection and the user is unable to pause the video to interact with any ancillary content. In the case of DVDs without such Internet connectivity, the user can only navigate through the ancillary content embedded in the DVD, and cannot perform any real-time transactions (e.g., buy a copy of a movie soundtrack through an e-commerce transaction) or other user interaction.

Other interactive programs permit users to watch content (e.g., a television episode) and log onto a website afterwards to purchase items viewed during the show (e.g., a wristwatch worn by an actor in the show).

Some interactive programs in a broadcast environment utilize the vertical blanking interval (VBI) to insert data into the broadcast stream, thus enabling interactive functionality. For example, with web television, users may play along with game shows as they are being broadcast. However, this approach is limited to the broadcast arena where the primary content (e.g., a television show) cannot be interrupted while the user interacts with ancillary content.

While the foregoing interactive programs provide users with an enhanced experience, they are limited in providing real-time interactivity between the user and the content while the user is viewing the primary content and do not provide a user-friendly experience. Therefore there exists a need for interactive video content programming that permits the user to stop the video play to view ancillary content, and then continue video play from the point in time where play was stopped.

SUMMARY OF THE INVENTION

The present invention is directed to a system and methods for creating and distributing interactive video content (IVC). IVC includes the creation of interactive content using software tools (e.g., Flash™ and Shockwave®), and digital assets (e.g., a movie or television commercial), and distributing the created interactive content in real-time to a user over an Internet Protocol (IP)-based network (e.g., Internet and intranet), or other network supporting two-way communication, to provide an interactive user experience.

As used herein, the term "content" is meant to include all forms of viewable electronic information including, but not limited to, advertisements, promotions, music videos, motion pictures, and television programs. A preferred embodiment of the present invention is directed to a method for using an interactive video including displaying a video on a visual display, the video having at least one interface link associated therewith, the interface link adapted to be displayed on the visual display and being linked to ancillary content accessible over a network (wire or wireless); interacting with the interface link to access the ancillary content; interrupting the display of the video at a point in time; delivering the ancillary content to the visual display; and continuing the display of the video from the point in time where the display of the video was interrupted.

As used herein, the phrase "ancillary content" is meant to include any content or page of content linked to the primary content or content linked therefrom. Also as used herein, the phrase "visual display" is meant to include all types of video or audio-visual devices including, but not limited to, screens for computer and televisions, personal digital assistants, or any other device that provides visual content to a user. As used herein, the phrase "interface link" is meant to include any means that functions as a link between video content and another piece of content, for example, a hypertext link under an Internet protocol regime.

Each interface link is preferably associated with, or related to, content being displayed on the screen. For example, if the user is watching a basketball game, and the user is interested in a particular shoe worn by a basketball player, the user may select the interface link associated with the basketball player's shoe. Interacting with the interface link associated with the basketball shoe allows the user to access one or more pages of information or media content related to the shoe of interest, including retail information. During the user's interaction with the interface link, the video stream is paused until the user returns to or continues the video stream delivery. Thus, a user may freely interact with one or more interface links to gain more information about an object of interest being displayed without missing any of the primary content video. As used herein, the phrase "primary content" is meant to include any content first requested by or to be shown to the user.

The present invention is also directed to a method for creating an interactive video, including creating a link program adapted to interrupt the delivery of video to a visual display and provide access to ancillary content accessible over a network; encoding the video onto a storage medium adapted to store video content; associating the link program with the video; delivering the video to the visual display; and displaying the video on the visual display.

Once an interactive video has been created, it may be distributed in several ways. A preferred distribution channel is to stream the video over an Internet Protocol (IP)-based network (e.g., Internet and intranet). Interface links may be displayed with the video stream in several ways. For example, interface links may be delivered separately from the video stream such that the links overlay the video stream content when displayed to the user (a "floating" interface link), or the interface links may be embedded in the video stream itself. Delivering interface links separately from the video stream eliminates any need to modify the original video content to support one or more interface links. Interaction with the interface link provides the user access to at least one IP address, for example, a web page address.

The present invention provides real-time interactivity that permits the user to effortlessly make a real-time transaction during the viewing of the program. The present invention may also be used for advertisements and specialized e-commerce opportunities.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

OF THE PREFERRED EMBODIMENTS

Reference will now be made in detail to the present preferred embodiments (exemplary embodiments) of the invention, examples of which are illustrated in the accompanying drawings.

Figure 1:
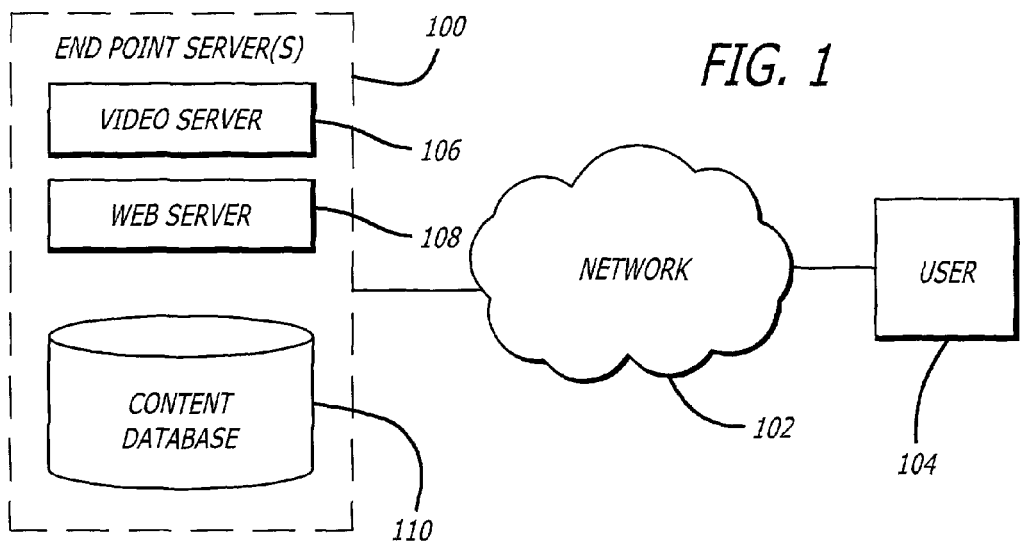
FIG. 1 is a schematic diagram of system components in accordance with a preferred embodiment of the present invention.

The present invention is directed to a system and methods for creating and distributing interactive video content. Unless otherwise stated, the present invention will be described in relation to using streamed video over an IP-based network such as the Internet, although a person of ordinary skill in the art will appreciate that other means of video delivery are possible and within the scope of the present invention. FIG. 1 is a schematic diagram of a preferred embodiment of the invention. As shown in FIG. 1, endpoint servers 100 deliver media content (e.g., movies, television shows, and ads) through a network 102 to one or more users 104. Network 102 may be any network that accommodates electronic delivery of content including, but not limited to, satellite transmission, wireless networks, digital subscriber lines, cable, and other communication networks. Endpoint servers 100 are preferably located in the vicinity of a service provider, such as an Internet service provider for example, in order to utilize the service provider's broadband network for streaming media content to a user and allow for more efficient communication between user 104 and endpoint server 100.

Endpoint servers 100 preferably include a video server 106, a web server 108, and a content database 110. It should be understood that endpoint servers 100 may include only one server. Video server 106 may be any server adapted to store and provide access to video content suitable for streaming to users. Web server 108 may be any server adapted to serve static images (e.g., JPEG or GIF), HTML assets (e.g., a retail website), text, and other IP-based file types (e.g., Flash™ and Shockwave®). A preferred form of web server 108 is a HTML server. Content database 110 preferably stores data for use with web server 108, and metadata associated with video content stored on video server 106 and may have a storage capacity expandable by known methods. It will be appreciated by those of ordinary skill in the art that in any of the embodiments of the present invention, the number of servers may range from one to many depending upon the system requirements to be met. Likewise, the system architecture between individual servers may be varied and load-balanced in known ways in order to provide optimal system efficiency.

Figure 2:
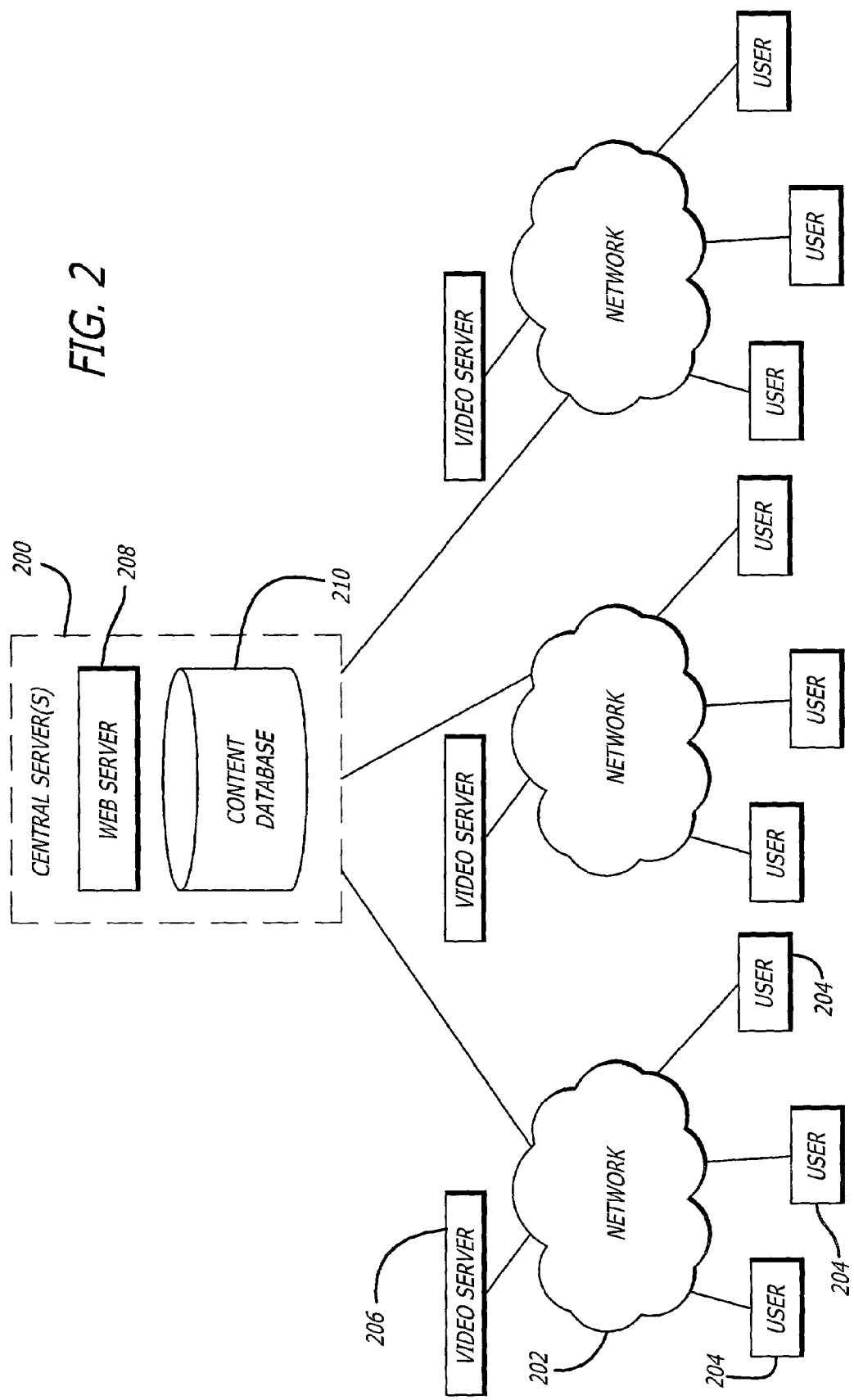
FIG. 2 is a schematic diagram of system components in accordance with another preferred embodiment of the invention.

FIG. 2 shows a preferred embodiment of the system of the present invention with the system components in a centralized architecture. Central servers 200 include a web server 208 and a content database 210. Web server 208 and content database 210 have similar functions as web server 108 and content database 110, respectively, shown and described in FIG. 1. Instead of being located regionally or locally in the vicinity of an Internet service provider, web server 208 and content database 210 are centrally located to provide access to a plurality of users 204 over a plurality of local or regional networks 202, each network 202 having associated therewith at least one video server 206. By centrally locating web server 208 and content database 210, media content may be more efficiently managed, for example, by reducing the amount of duplication otherwise required with greater numbers of servers and databases. It should be understood that central servers 200 may include only one server.

Figure 3:
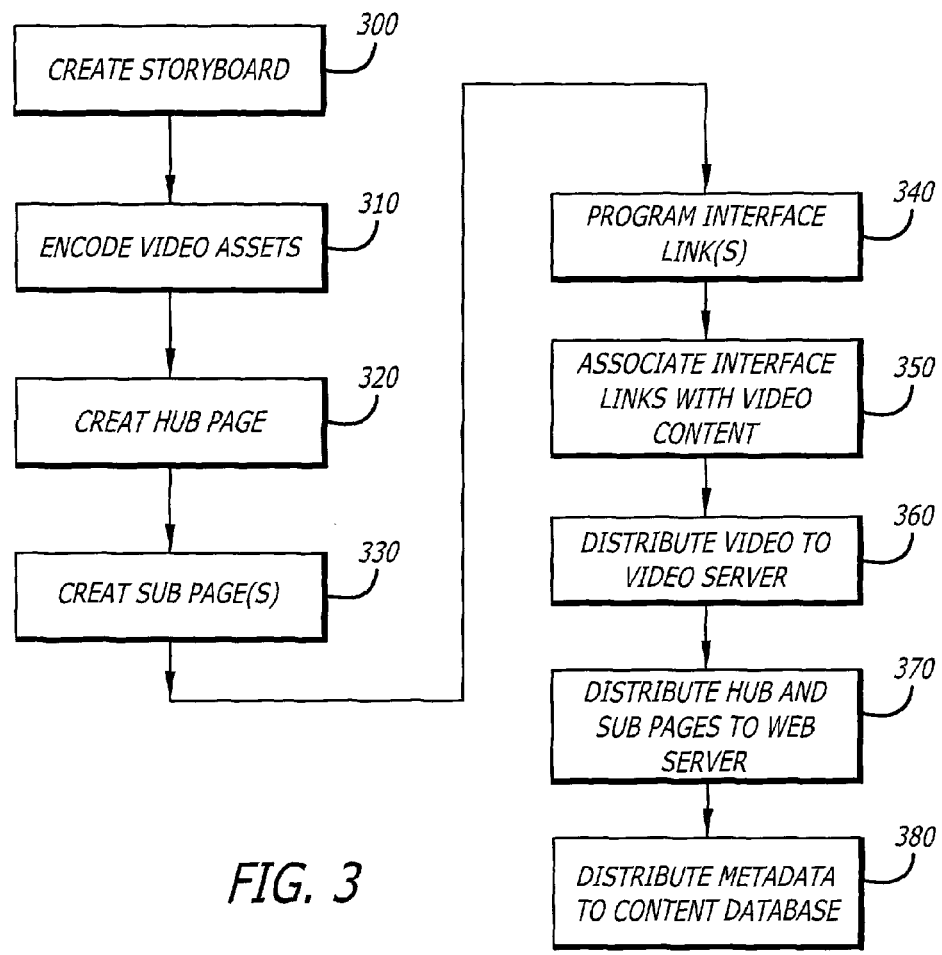
FIG. 3 is a logic diagram of a preferred method for creating interactive video content.

FIG. 3 shows a preferred method for creating interactive video content. In step 300, a preferably non-linear storyboard is created. A non-linear storyboard sets forth a few of screens and/or images to be presented to the user during the user's interaction with the video content. A user may access one or more storyboards during the streaming of the video content via an interface link. Each interface link is preferably associated with a storyboard. Selecting or otherwise interacting with an interface link permits a user to access information or media content associated with a streamed object that the interface link is linked to. The storyboard preferably includes a "hub page" (the first page the user sees after interacting with the interface link) and at least one "sub-page" (any page linked to the hub page). Any of the storyboard pages may be, for example, a web page using graphics and/or text, or a streamed video asset. By being non-linear, a user may be presented with a plurality of choices at each level of selection (e.g., at the hub page and any number of subsequent sub-pages).

In step 310, video and/or audio assets are encoded. Encoding step 310 includes converting video and/or audio assets into computer files that are readable by an application adapted to show video to a user, for example, a media player application. Video content is preferably encoded as ASF, MPEG4 files to take advantage of encryption opportunities. However, interactive media files may also be encoded as, for example, Quick-time™ files or AVI video files. A preferred encoding software is Windows® Media Encoder 7.0™. Preferably, both primary video content (i.e., the video initially requested by the user) and any ancillary video content (i.e., video that may be viewed while the primary video content is paused) are encoded onto the same storage medium. As a person of ordinary skill in the art will recognize, various software applications may be used to encode content without departing from the scope of the present invention.

In step 320, one or more hub pages may be created. Hub pages are created using any software tool adapted to create and populate IP-based pages (e.g., web pages). Preferred software includes, for example, Flash™, Shockwave®, HTML, and DHTML. In step 330, one or more sub-pages are created using tools such as those used to create hub pages. Hub pages preferably include a link back to the point at which the video content stream was paused or interrupted, and one or more links to sub-pages. Sub-pages themselves may include links to more sub-pages, or a back link to the hub page or to the interruption point of the video. Each hub page or sub-page may include one or more links to commerce sites.

As used herein, the phrase "commerce site" is meant to include a site residing at an electronic address that is adapted to handle commercial transactions, for example only, a retailer website using an IP address.

After the hub pages and sub pages are created, they are preferably entered into a content management system for tracking and display purposes. "Tracking" includes accounting for the exhibition of the video asset by means of a unique identifier. A preferred example of a content management system operable with the present invention is taught in U.S. application Ser. No. 09/921,100, titled "Content Management System," filed Jul. 31, 2001, which claims priority to U.S. application No. 60/280,691, the disclosures of which are hereby incorporated by reference herein.

The creation of links is described in more detail below. Hub pages and sub-pages may be stored, for example, on web server 108, 208, a retailer site, or on client software at the user's location.

In steps 340 and 350, interface links are programmed according to the intended method of presentation and associated with a piece of video content, whether primary or ancillary.

Interface links may be presented in several ways on a user's visual display. For example, interface links may be embedded in the video content such that the links are streamed with the video content from video server 106, 206. Embedded interface links may be created by on-line software such as Smoke® (available from Discreet Logic™), Final Cut Pro® (available from Apple Computer™), or Avid® (available from Avid Technology™). Preferably, the embedded interface link is located in the lower left hand corner, inside the video delivery area intended for the visual display, just outside the intended delivery area for Internet protocol.

Interface links may also be hidden from view such that no icons are visible. In this instance a user may, for example, when selecting with a mouse, run the cursor over an object of interest (an on-screen object that the viewer is interested in learning additional information about). When the cursor contacts the on-screen object (e.g., a shoe worn by a player during a basketball game) an icon or other visual effect may appear signifying that an interface link is available for the object of interest. Hidden interface links may be created by embedding an interface link as an invisible layer on top of the streaming video with known editing applications that can generate navigational instructions via, for example, Lingo™ (available from Macromedia®), Visual Basic® ("VB"; available from Microsoft®), ActiveX® (available from Microsoft®), Coms, or DirectX™ (available from Microsoft®).

Hidden interface links may be placed on the canvass of a video stream over a single pixel, or over a greater number of pixels about the display area. Hidden interface links may be adapted to serve a number of purposes such as detecting a full screen event like an indiscriminate key stroke or mouse function to trigger an event such as an HTML page call or a chapter advance to another video sequence. A hidden interface link may also be used with a single pixel to make a cursor change indicate a hot mouse event on a specific part of the video stream, or be used for marketing and/or user feedback.

Interface links may also be delivered from web server 108, 208 and shown on the user's display as an overlay to the streaming video, for example, as a visible, translucent icon (e.g., "floating bug") or other user interface (UI). User 104, 204 would then be receiving two simultaneous transmissions: one from video server 106, 206 and one from web server 108, 208. Interface links delivered from web server 106, 206 may be delivered as a timed program that coincides with the video content being streamed. In such an instance, interface links may be preprogrammed to interact with, for example, time code markers embedded in the video stream, such that one or more interface links may appear or disappear based on the time elapsed. The association of interface links with time code markers may be achieved by known video editing or encoding applications. The appearance of a time code marker may be triggered when a time code window of the application delivering the video, for example, a media player, reaches a selected frame. For example, an interface link may appear in the right hand corner of the user's display after five minutes have elapsed during a video presentation to coincide with the entrance of an object of interest (e.g., an automobile coming from the right corner of the display). This process is akin to laying a template over the user's display, rather than embedding interface links in the video stream.

It is appreciated that an interface link program may be delivered to client software operatively connected to the user's visual display to interact with video delivered from video server 106, 206. In this embodiment, delivery of the interface link program need not be simultaneously delivered with the video to the user since the interface link program would already be at the user's visual display. Links to and between non-video content between pages may also be programmed as needed. Multiple links may be associated with the video using a variety of formats (e.g., hidden or translucent icons) which change with both time and location as the video plays.

In step 360, video content is distributed to one or more video servers 106, 206. Video may be distributed by any means adapted to deliver video content from one location to another, for example, manual delivery, satellite transmission, wireless delivery, digital subscriber line, and cable. In step 370, hub pages and sub-pages are distributed to web server 108, 208. In step 380, metadata is distributed to content database 110, 210. Distribution mediums may be the same as those already mentioned in conjunction with video content distribution. It should be understood that the aforementioned steps need not be performed in a particular order. For example, the video assets may be encoded before the creation of the storyboard in step 300. The creation and distribution of the hub and sub-pages to web server 108, 208 may occur independently of the creation and distribution of the video assets to video server 106, 206. In addition, the creation and distribution of metadata to content database 110, 210 may occur independently of either of the above.

Figure 4:
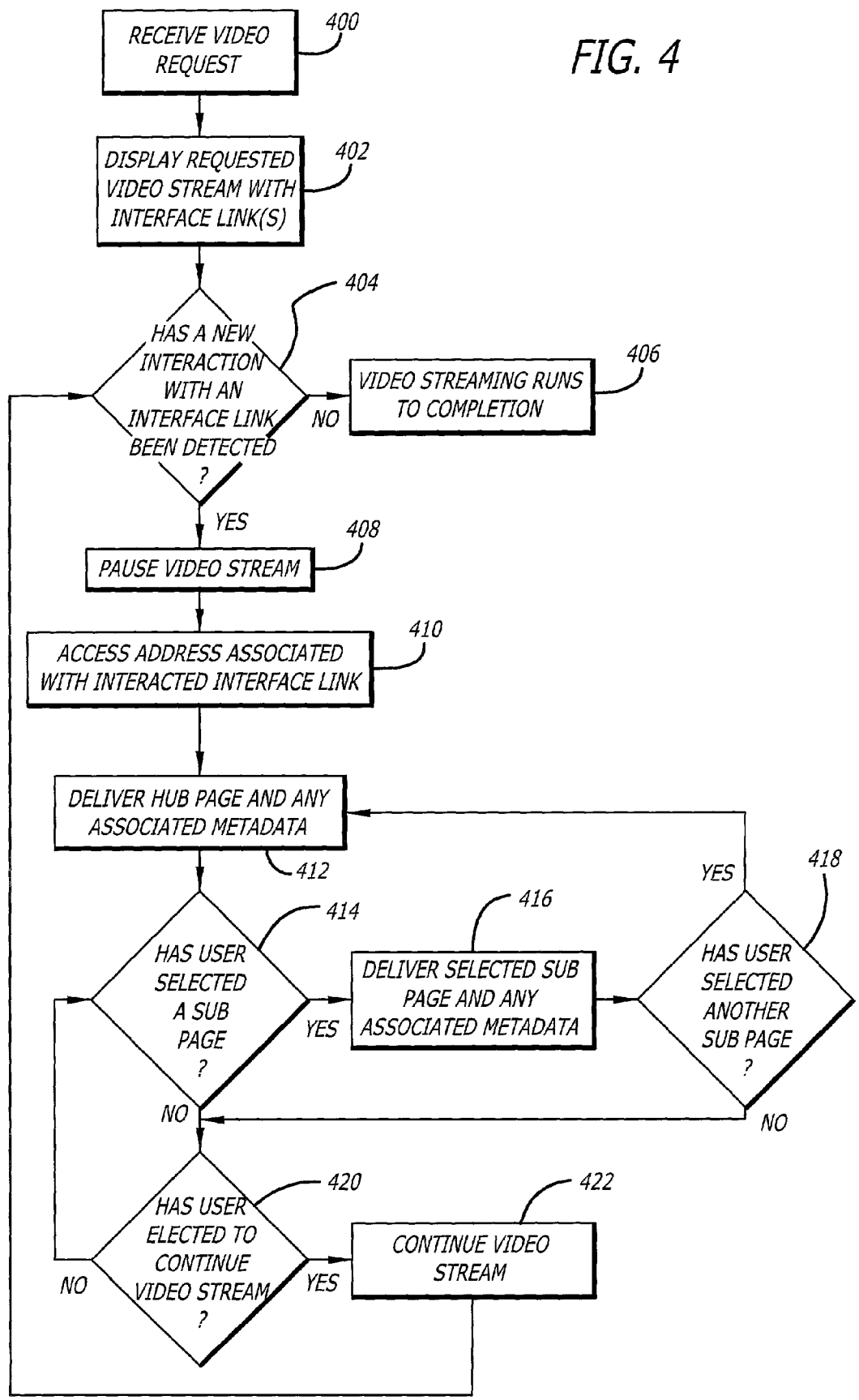
FIG. 4 is logic diagram of a preferred method for delivering interactive video content.

FIG. 4 shows a preferred method for delivering interactive video. In step 400, video servers 106, 206 receive a video request. In step 402, video servers 106, 206 stream requested video to the user's visual display. A preferred delivery program for streaming video content to user 104, 204, is Windows Media Player™. During video streaming, one or more interface links are delivered to the user's display and associated with the displayed video.

As a user is receiving a requested video stream, the user may be presented with one or more interface links. If the user decides to interact with an interface link in step 404, then the user selects a desired interface link corresponding to an object of interest. A user may interact with an interface link by, for example, touching an area of the display, voicing a command, pointing and clicking with a mouse, using a beam of light aimed at an area of the display, or any other interaction that conveys the user's desire to interact with an interface link. Once an interaction with the interface link has been detected, in step 408 the video stream is paused or interrupted.

In step 410, the IP address associated with the interacted interface link is accessed. For example, in a web setting, a web page address is accessed and the user request is sent to the URL for the hub page, which is preferably served from a centrally located HTML server. In step 412, a hub page and any associated metadata with the accessed address are delivered to the user. The user may then view the hub page and make a sub-page selection in step 414. If the user selects a sub-page, then in step 416 a selected sub-page and any associated metadata is delivered to the user.

In step 418, the user may decide whether to request a different hub page, a previous hub page, or a new sub-page (though not illustrated, step 418 may loop to step 416 for as many times as a user desires to access a different sub-page). If the user decides not to select any further pages, then in step 420 the user may decide whether to continue the video stream in step 422. If the user does not elect to continue the video stream in step 420, then the user may continue to view the page that the user is viewing, or select one or more new pages and continue the video stream at anytime. Choosing to continue or return to the video stream will bring the user back to the point where the video streaming was interrupted. This may be done by a user action which activates the browser window containing the video stream.

After the video streaming has been continued, the user may select another link and thus repeat steps 404-422. It should be understood that the aforementioned steps need not occur in a particular order, or include all steps. For example, hub pages are not required to have sub-pages associated therewith. Therefore, in instances where a hub page has no associated sub-page, steps 414-418 may be omitted.

Each hub page or sub-page may contain e-commerce opportunities, i.e., retail information and/or links to retail sites for ordering desired items and completing commercial transactions. For example, during the presentation of an action film showing a snow-ski chase, a user might be interested in the brand of skis that a particular actor may be wearing. The user may select an interface link associated with the ski shown on the user's display. If the user is using a computer with a mouse, the user may simply point and click on the ski of interest, thereby pausing or interrupting the movie and delivering a hub page showing retail information regarding the particular ski of interest. The user may then choose among different sub-pages showing more information about the desired ski, or may order the ski from one or more of the pages.

Sub-pages may themselves contain video assets. For example, if a hub page contains information about an automobile, a sub-page link might lead to a video demonstration of the automobile's performance in various conditions. After exploring the hub page and any of various sub-pages, the user may elect to return to the primary video content at the point of interruption. It will be appreciated that the hub pages may or may not include ancillary video assets depending upon, for example, the system requirements and the storyboard intended to be designed around the primary content.

Interface link graphical images or icons (for visible icons) are preferably translucent to provide little distraction to the user during the video content presentation. For example, a preferred interface link includes a graphic that is slightly beveled, fifty percent transparent, and approximately 60 by 50 m pixels in size. The icons may be created software such as, for example, Adobe® Photoshop™ and others.

Figure 5:
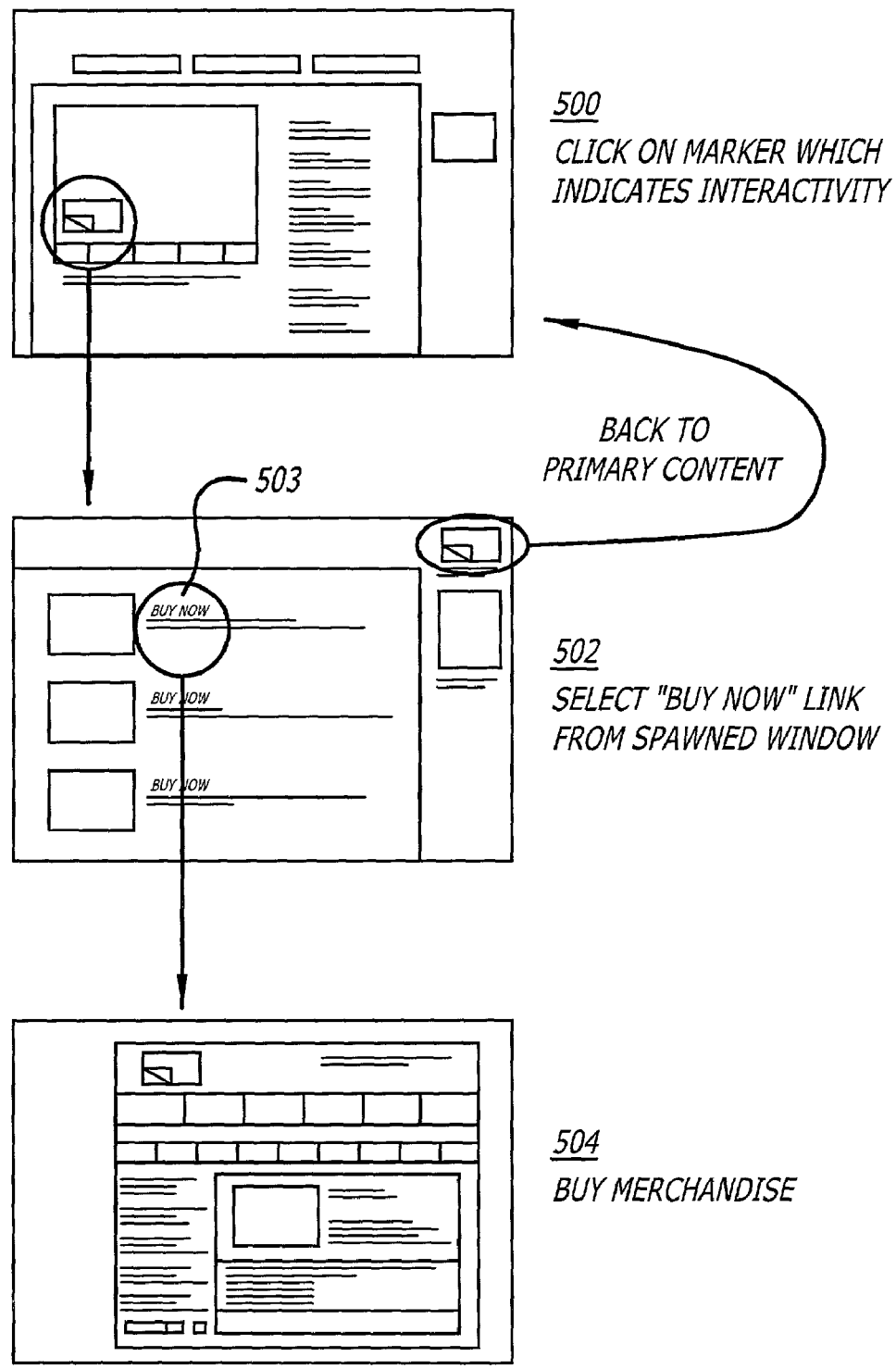
FIG. 5 is a logic diagram of a preferred method for conducting e-commerce through an interactive video.

FIG. 5 shows an example of an interaction with a storyboard having e-commerce opportunities. The user first requests the primary content (e.g., movie). When such a request is made, the primary content is streamed from video server network 106, 206 to the user with a marker indicating the availability of interactivity (e.g., the "floating bug"). If the user is interested in obtaining information about an object being displayed in the video (e.g., a coat worn by an actress), then in step 500 the user selects the "floating bug" associated with the object of interest. The primary content video stream is paused while the user request for information is sent to the URL for the hub page located on web server 108, 208. The hub page is then served to the user from web server 108, 208. If the user is interested in purchasing the object of interest (e.g., the coat), or any other object or service contained on the hub page, then in step 502 the user selects an interface link 503 labeled "buy now" associated with the object or service the user is interested in purchasing. Selecting interface link 503 connects the user with a retail web site having purchasing opportunities for the objects or services of interest. In step 504, the user proceeds to buy merchandise from the retail site. The retail site may be operated by a commercial entity responsible for presenting the primary video, or an outside entity. The retail web site may be a sub page served by web server 108, 208, or a web site located outside the system. At any point, the user may select an icon to revert to a previous page or the primary content. Set forth below are examples of preferred embodiments of the system and methods of the present invention:

Interactive Content Programming (ICP) includes several features:

1. ICP-enabled content will be visually distinguishable from other content via the translucent "bug" or other user interface (UI) linking element floating over the video content. The "floating bug" provides an interactive experience without modifying the primary content. This UI element both signals ICP availability, and accepts user "clicks" to trigger transition to the linked content.

2. If the ICP linking element is clicked, the UI is redirected to a programmed "place" (e.g., web page) that may include a variety of interactive content options. The place will be specified as a URL to be loaded over a current frame, or in place of the current page. The place may be an e-commerce opportunity, another video segment, or the like. In the most general case, any arbitrary URL (in any web-friendly format) may be the target. Preferably, multiple linkages from the video will be offered in a variety of formats (e.g., other than the translucent "bug"), which may be adapted to change with both time and space as the video plays.

3. When the user is done with the linked content and returns to the original video, it resumes at the point at which the user left it (i.e., the user does not miss a frame of original video).

An example of creating an ICP includes the following steps:

1. Create a non-linear storyboard. An example of a non-linear storyboard is found above in FIG. 5. The storyboard typically includes a "hub" page which is the first page the user sees when they click the "bug" to access the interactive content. The "bug" can link to the hub page or any page linked to from the hub. The hub page and all other sub pages preferably include a link back to the video where it left off, or in the case of a sub page, a link back to the hub page.

2. Encode the video assets and/or audio assets (e.g., the primary content and any ancillary content used on sub and hub pages) using encoding software (such as Windows Media Encoder 7.0™).

3. Utilizing software tools (e.g., Flash™, Shockwave®, HTML), create the hub page (e.g., a web page using graphics, text).

4. Utilizing software tools (e.g., Flash™, Shockwave®, HTML), create one or more sub pages (e.g., a web page using graphics, text).

An example of deploying an ICP includes the following steps:

1. For deployment of an ICP, the content management system allows content to include a URL for linking and accommodates "floating bug" insertion. For each video asset associated with the ICP, the hub pages and sub pages are entered into the content management system for tracking and display purposes.

2. All HTML assets are placed on a central HTML server, which can be accessed by multiple versions of client applications (e.g., ".com" and ".tv" entities).

3. All of the video assets are distributed into the video server network (e.g., Akamai™). The video server network distributes the video content nationwide to individual users (i.e., client applications).

4. The client application is enabled to exhibit the ICP by modifying the content database accessible by the public to include the ICP.

Now the user can select the ICP and receive an interactive experience by requesting the primary content (e.g., movie). When such a request is made, the primary content is streamed from the video server network to the client application with the "floating bug." Upon the user selecting the bug (e.g., by clicking on the "bug"), the primary content video stream is paused and the user request is sent to the URL for the hub page located on the central HTML server. The hub page is then served to the client application from that central HTML server. The hub page may or may not include ancillary video assets also served from the video server network. A user may explore the hub pages and sub pages including any ancillary video assets and at any point click to return to the primary content where they left.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for using an interactive video, the method comprising:
   streaming the video from a remote location over an Internet protocol-based network and displaying the video on a visual display for a user, the video having at least one interface link associated therewith, the interface link adapted to be displayed on the visual display and being linked by a universal resource locator (URL) to ancillary content accessible over the network;
   interacting, during the streaming of the video, in a single interaction with the interface link to both;
   (a) interrupt, at the remote location, the streaming of the video at a point in time so as to prevent streaming of the video over the network; and
   (b) transmit a request of the user for the ancillary content over the network to a remote site of the URL where the ancillary content is stored;
   delivering the ancillary content over the network and displaying the ancillary content on the visual display; and
   continuing the streaming of the video over the network from the point in time when the streaming of the video was interrupted after the interacting with the interface link.

2. The method of claim 1, wherein the interrupting of the streaming of the video includes pausing the video.

3. The method of claim 1, wherein the interacting with the interface link includes interacting with the interface link being embedded in the video.

4. The method of claim 1, wherein the interacting with the interface link includes overlaying the interface link on the video on the visual display.

5. The method of claim 1, wherein the interacting with the interface link includes interacting with the interface link originating from a feed separate from a feed of the video.

6. The method of claim 1, wherein the interacting with the interface link includes hiding the interface link from view on the visual display when the interface link is not being interacted with by the user.

7. The method of claim 1, wherein the displaying of the video includes displaying the interface link as at least a partially transparent graphic.

8. The method of claim 1, wherein the interacting with the interface link includes interacting with primary ancillary content having a link to secondary ancillary content.

9. The method of claim 1, wherein the displaying of the video includes displaying the interface link having an appearance of moving across a screen of the visual display as the video is being played.

10. The method of claim 1, wherein the interacting with the interface link includes conducting a commercial transaction with the user.

11. The method of claim 10, wherein the interacting with the interface link includes accessing the ancillary content having a link to a site adapted to transact the commercial transaction.

12. The method of claim 1, wherein the interacting with the interface link includes accessing the ancillary content including information relating to the video.

13. The method of claim 1, wherein the interacting with the interface link includes accessing the ancillary content including video.

14. The method of claim 1, wherein the interacting with the interface link includes conducting a commercial transaction using the ancillary content.

15. The method of claim 1, wherein the displaying of the video includes displaying the video having a plurality of the interface links associated therewith.

16. The method of claim 1, wherein the network supports two-way communication.

17. The method of claim 1, wherein the Internet protocol-based network includes an intranet-based network.

18. The method of claim 1, wherein the remote location includes an endpoint server.

19. The method of claim 18, wherein the endpoint server includes at least one video server, at least one web server, and at least one content database.

20. The method of claim 1, wherein the network includes a wireless network.

21. A method for using an interactive video, the method comprising:
   streaming the video from a remote location over an Internet protocol-based network and displaying the video on a visual display for a user, the video having at least one interface link associated therewith adapted to be displayed on the visual display, the interface link being linked by a universal resource locator (URL) to provide access to ancillary content;
   interacting, during the streaming of the video, in a same interaction with the interface link to both;
   (a) interrupt at the remote location, the streaming of the video over the network at a point in time so as to prevent streaming of the video over the network; and
   (b) the ancillary content over the network to a remote site of the URL where the ancillary content is stored;
   displaying the ancillary content on the visual display; and continuing the streaming of the video from the remote location over the network and continuing the display of the video on the visual display from the point in time when the streaming of the video was interrupted after the interacting with the interface link.

22. The method of claim 21, wherein the interrupting of the streaming of the video includes pausing the video.

23. The method of claim 21, wherein the interacting with the interface link includes interacting with the interface link being embedded in the video.

24. The method of claim 21, wherein the interacting with the interface link includes overlaying the interface link on the video on the visual display.

25. The method of claim 21, wherein the interacting with the interface link includes interacting with the interface link originating from a feed separate from a feed of the video.

26. The method of claim 21, wherein the interacting with the interface link includes hiding the interface link from view on the visual display when the interface link is not being interacted with.

27. The method of claim 21, wherein the displaying of the video includes displaying the interface link as at least a partially transparent graphic.

28. The method of claim 21, wherein the interacting with the interface link includes interacting with primary ancillary content having a link to secondary ancillary content.

29. The method of claim 21, wherein the streaming of the video includes delivering the interface link having an appearance of moving across a screen of the visual display as the video is being played.

30. The method of claim 21, wherein the accessing of ancillary content includes conducting a commercial transaction with the user.

31. The method of claim 20, wherein the accessing of ancillary content includes accessing the ancillary content having a link to a site adapted to transact the commercial transaction.

32. The method of claim 21, wherein the accessing of ancillary content includes accessing the ancillary content including information relating to the video.

33. The method of claim 21, wherein the accessing of ancillary content includes accessing the ancillary content including video.

34. The method of claim 21, wherein the accessing of ancillary content includes conducting a commercial transaction using the ancillary content.

35. The method of claim 21, wherein the streaming of the video includes streaming the video having a plurality of the interface links associated therewith.

36. The method of claim 21, wherein the network supports two-way communication.

37. The method of claim 21, wherein the Internet protocol-based network includes an intranet-based network.

38. The method of claim 21, wherein the remote location includes an endpoint server.

39. The method of claim 38, wherein the endpoint server includes at least one video server, at least one web server, and at least one content database.

40. The method of claim 21, wherein the network includes a wireless network.

41. A method for displaying an interactive video, the method comprising:
streaming the video from a remote location over an Internet protocol-based network and displaying the video on a visual display for a user, the video having an embedded interface link associated therewith while the video is displayed, the interface link being linked by a universal resource locator (URL) to ancillary content accessible over the network;
interacting, during the streaming of the video, with the interface link to both;
(a) interrupt at the remote location, the streaming of the video at a point in time so as to prevent streaming of the video over the network; and
(b) transmit a request of the user for the ancillary content over the network to a remote site of the URL where the ancillary content is stored;
displaying the ancillary content on the visual display; and
continuing the streaming of the video over the network from the point in time when the streaming of the video was interrupted after the interacting with the interface link.

42. The method of claim 41, wherein the interrupting of the streaming of the video includes pausing the video.

43. The method of claim 41, wherein the interacting with the interface link includes hiding the interface link from view on the visual display when the interface link is not being interacted with.

44. The method of claim 41, wherein the displaying of the video on the visual display includes displaying the interface link as at least a partially transparent graphic.

45. The method of claim 41, wherein the interacting with the interface link includes interacting with primary ancillary content having a link to secondary ancillary content.

46. The method of claim 41, wherein the displaying of the video includes displaying the interface link having an appearance of moving across a screen of the visual display as the video is being played.

47. The method of claim 41, wherein the interacting with the interface link includes conducting a commercial transaction with the user.

48. The method of claim 47, wherein the interacting with the interface link includes accessing the ancillary content having a link to a site adapted to transact the commercial transaction.

49. The method of claim 41, wherein the interacting with the interface link includes accessing the ancillary content including information relating to the video.

50. The method of claim 41, wherein the interacting with the interface link includes accessing the ancillary content including video.

51. The method of claim 41, wherein the interacting with the interface link includes conducting a commercial transaction using the ancillary content.

52. The method of claim 41, wherein the displaying of the video on the visual display includes displaying the video having a plurality of the interface links associated therewith.

53. The method of claim 41, wherein the network supports two-way communication.

54. The method of claim 41, wherein the Internet protocol-based network includes an intranet-based network.

55. The method of claim 41, wherein the remote location includes an endpoint server.

56. The method of claim 55, wherein the endpoint server includes at least one video server, at least one web server, and at least one content database.

57. The method of claim 41, wherein the network includes a wireless network.

58. A method for displaying an interactive video, the method comprising:
streaming the video from a remote location over an Internet protocol-based network and displaying the video on a visual display for a user;

displaying an overlaid interface link with the video based on a time elapsed during the display of the video, the overlaid interface link being displayed through a feed separate from a feed of the video, the overlaid interface link being linked by a universal resource locator (URL) ancillary content;

interacting, during the streaming of the video, with the interface link to both;
   (a) interrupt at the remote location, the streaming of the video at a point in time so as to prevent streaming of the video over the network; and
   (b) display on the visual display the ancillary content received over the network from a remote site of the URL where the ancillary content is stored; and continuing the streaming of the video over the network from the point in time when the streaming of the video was interrupted after the interacting with the interface link.

59. The method of claim 58, wherein the interrupting of the streaming of the video pausing the video.

60. The method of claim 58, wherein the interacting with the interface link includes hiding the interface link from view on the visual display when the interface link is not being interacted with.

61. The method of claim 58, wherein the displaying of the video on the visual display includes displaying the interface link as at least a partially transparent graphic.

62. The method of claim 58, wherein the interacting with the interface link includes interacting with primary ancillary content having a link to secondary ancillary content.

63. The method of claim 58, wherein the displaying of the overlaid interface link includes displaying the interface link having an appearance of moving across a screen of the visual display as the video is being displayed.

64. The method of claim 58, wherein the interacting with the interface link includes conducting a commercial transaction with the user.

65. The method of claim 64, wherein the interacting with the interface link includes accessing the ancillary content having a link to a site adapted to transact the commercial transaction.

66. The method of claim 58, wherein the interacting with the interface link includes accessing the ancillary content including information relating to the video.

67. The method of claim 58, wherein the interacting with the interface link includes accessing the ancillary content including video.

68. The method of claim 58, wherein the interacting with the interface link includes conducting a commercial transaction using the ancillary content.

69. The method of claim 58, wherein the displaying of the video on the visual display includes displaying the video having a plurality of the interface links associated therewith.

70. The method of claim 58, wherein the displaying of the video on the visual display includes interacting with a time code marker embedded in the video.

71. The method of claim 58, wherein the network supports two-way communication.

72. The method of claim 58, wherein the Internet protocol-based network includes an intranet-based network.

73. The method of claim 58, wherein the remote location includes an endpoint server.

74. The method of claim 73, wherein the endpoint server includes at least one video server, at least one web server, and at least one content database.

75. The method of claim 58, wherein the network includes a wireless network.

76. A method for conducting commerce over an Internet protocol-based network during the display of a video, the method comprising:

streaming the video from a remote site over the network to a user and displaying the video on a visual display, the video having an interface link associated therewith, the interface link being linked by a universal resource locator (URL) to a commerce site adapted to conduct commerce with the user that is accessible over the network;

interacting, during the streaming of the video, with the interface link during the display of the video to both;
   (a) interrupt the streaming of the video at the remote site at a point in time so as to prevent streaming of the video over the network; and
   (b) access over the network the commerce site linked by the URL;

displaying the commerce site on the visual display; and continuing the streaming of the video from the remote site over the network from the point in time when the streaming of the video was interrupted after the accessing of the commerce site.

77. The method of claim 76, further comprising completing a transaction with the commerce site.

78. The method of claim 76, wherein the network supports two-way communication.

79. The method of claim 76, wherein the Internet protocol-based network includes an intranet-based network.

80. The method of claim 76, wherein the remote location includes an endpoint server.

81. The method of claim 80, wherein the endpoint server includes at least one video server, at least one web server, and at least one content database.

82. The method of claim 76, wherein the network includes a wireless network.

83. A method for creating an interactive video, the method comprising:

encoding and storing the video onto a remote storage medium at a first site;

creating a link program adapted to both;
   (a) interrupt streaming of the video at the remote storage medium to prevent streaming of the video over an Internet protocol-based network to a second site; and
   (b) access ancillary content accessible over the network with a universal resource locator (URL) to a remote site where ancillary content is stored, the link program linking the ancillary content and the video to a point in time when the streaming of the video from the remote storage medium is interrupted;

associating the link program with the video;

streaming the video and the link program over the network;

displaying the video on the visual display;

interrupting, at the first site, the streaming of the video in response to interacting with the link program so as to prevent streaming of the video over the network; and continuing the streaming of the video over the network from the point in time when the streaming of the video was interrupted.

84. The method of claim 83, wherein the associating of the link program includes encoding the link program with the video onto the storage medium.

85. The method of claim 84, wherein the encoding of the link program is performed simultaneously with encoding the video.

86. The method of claim 83, wherein the streaming of the video over the network includes delivering the link program in a feed separate from a feed of the video.

87. The method of claim 83, wherein the streaming of the video over the network includes overlaying the video with the link program during the displaying of the video on the visual display.

88. The method of claim 83, wherein the associating of the link program with the video includes embedding a time code marker in the video to permit the display of an interface link to the ancillary content based on the time elapsed during the displaying of the video.

89. The method of claim 83, wherein the network supports two-way communication.

90. The method of claim 83, wherein the Internet protocol-based network includes an intranet-based network.

91. The method of claim 83, wherein the remote location includes an endpoint server.

92. The method of claim 91, wherein the endpoint server includes at least one video server, at least one web server, and at least one content database.

* * * * *

UNITED STATES PATENT AND TRADEMARK OFFICE
CERTIFICATE OF CORRECTION

PATENT NO. : 7,870,592 B2
APPLICATION NO. : 09/921097
DATED : January 11, 2011
INVENTOR(S) : Ron J. Hudson et al.

Page 1 of 1

It is certified that error appears in the above-identified patent and that said Letters Patent is hereby corrected as shown below:

On the Title Page 3, Item (56):
Line 43: change "http://www.streamlingmedia.com/article.asp?id=5025&page=1" to
-- http://www.streamingmedia.com/article.asp?id=5025&page=1 --.

Column 9:
Line 50: change "both;" to -- both: --.

Column 10:
Line 61: change "both;" to -- both: --;
Line 62: after "interrupt" insert -- , --; and
Line 65: after "(b)" insert -- access, --.

Column 11:
Line 34: change "20" to -- 30 --.

Column 12:
Line 5: change "both;" to -- both: --; and
Line 6: after "interrupt" insert -- , --.

Column 13:
Line 5: after "(URL)" insert -- to --;
Line 8: change "both;" to -- both: --;
Line 9: after "interrupt" insert -- , --; and
Line 20: after "video" (first occurrence) insert -- includes --.

Column 14:
Line 11: change "both;" to -- both: --;
Line 41: change "both;" to -- both: --; and
Line 47: after "where" insert -- the --.

Signed and Sealed this
Twenty-second Day of February, 2011

David J. Kappos
*Director of the United States Patent and Trademark Office*